United States Patent Office 3,476,755
Patented Nov. 4, 1969

3,476,755
8,13-DIAZASTEROIDS
Edward C. Taylor and Katherine Lenard, Princeton, N.J.
(both of 1500 Spring Gardens St., Philadelphia, Pa. 19101)
No Drawing. Filed Jan. 17, 1967, Ser. No. 609,784
Int. Cl. C07d *101/00;* A61k *27/00*
U.S. Cl. 260—251                                4 Claims

ABSTRACT OF THE DISCLOSURE 1,2,3-trimethoxy and 2,3-dimethoxy-8,13-diazaestra-1,3,5(10)-trien-17-ones, prepared by condensation of 3-succinimidopropionic acid with a phenethylamine, cyclization of the resulting amide with phosphorus oxychloride in benzene to give a dihydroisoquinoline, and reductive cyclization with hydrogen over platinum oxide to give a product, which has analgesic activity.

---

This invention relates to heterocyclic compounds having analgesic activity. In particular, the invention relates to 8,13-diazasteroid compounds and to intermediates therefor.

The principal compounds of the invention are represented by the following structural formula:

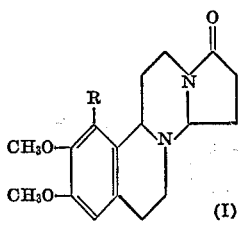

where R is hydrogen or methoxy.

The invention also consists of certain intermediate compounds useful for preparing the product compounds of Formula I. Principal among these intermediate compounds are those represented by Formulas II and III.

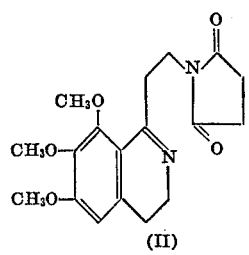 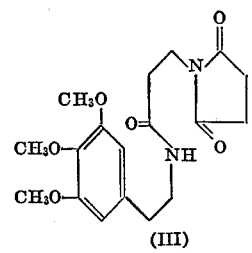

The compounds of the invention are prepared according to the procedure described below.

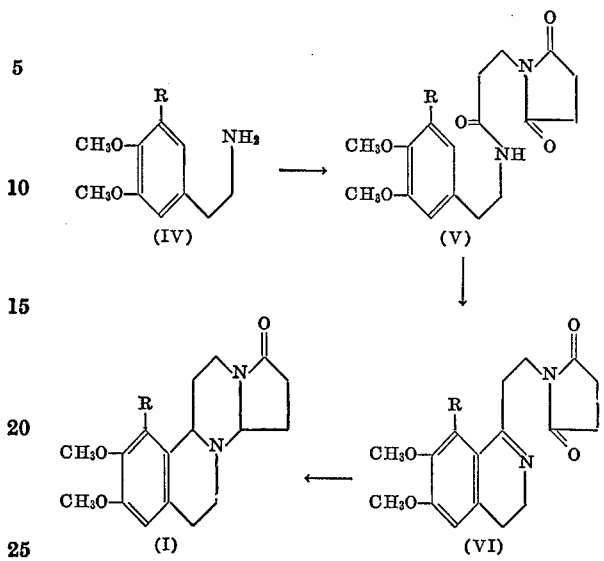

3-succinimidopropionic acid [J. Am. Chem. Soc. 74, 1323 (1952)] is converted to its acid chloride with thionyl chloride under nitrogen and then condensed with homoveratrylamine (IV, R=H) in tetrahydrofuran. The resulting amide (V, R=H) under normal Bischler-Napieralski cyclization conditions (phosphorus oxychloride in benzene) is converted smoothly to the dihydroisoquinoline (VI, R=H). Catalytic reduction in ethanol solution, using platinum oxide as catalyst, results in a one-step reductive cyclization to 2,3-dimethoxy-8,13-diazaestra-1,3,5(10)-trien-17-one (I, R=H). Success in the last step requires pure dihydroisoquinoline (VI) and complete absence of traces of acid. Use of mescaline (IV, R=CH₃O) as starting material in the same series of reactions results in the ultimate preparation of 1,2,3-trimethoxy - 8,13 - diazaestra - 1,3,5(10)-trien-17-one (I, R=CH₃O).

The product compounds (I) may be converted into their pharmacologically acceptable acid addition salts by reaction with such acids as hydrochloric, sulfuric, maleic, citric, fumaric, or benzoic in the conventional manner, either or both of the reactants being in the form of ethereal, acetone, or alcoholic solutions.

The product compounds have been found to possess analgesic activity in rats when evaluated in a standard test procedure and administered intraperitoneally at 0.5–5 mg./kg. They are formulated for use by combining them with standard pharmaceutical excipients in the conventional maner in order to prepare oral or parenteral compositions.

It will be apparent to those skilled in the art of organic chemistry that minor variations may be made in the compounds and processes for their preparation.

The following examples are intended to illustrate the preparation of the compounds of the invention.

EXAMPLE 1

2,3-dimethoxy-8,13-diazaestra-1,3,5(10)-pentaen-17-one 3-succinimidopropionic acid is prepared as described in J. Am. Chem. Soc. 74, 1323 (1952), except that acetone is used for the extraction of the acid instead of ethanol. This acid (10 g.) is boiled and stirred with 16 ml. of SOCl₂ under nitrogen for one half hour. The SOCl₂ is removed under reduced pressure and the residue is crystallized with ether. The acid chloride is dried in a dessicator for 1 hour and then used immediately.

To a stirred and cooled solution of 3.6 g. of 3,4-dimethoxyphenethylamine (homoveratrylamine) in 15 ml. of tetrahydrofuran under nitrogen is added a solution of 1.9 g. of 3-succinimidopropionyl chloride in 15 ml. of tetrahydrofuran under nitrogen is added a solution of 1.9 g. of 3-succinimidopropionyl chloride in 15 ml. of tetrahydrofuran. After addition is complete, stirring is continued at room temperature for a half hour and the resultant white precipitate filtered off and washed well with tetrahydrofuran. The combined filtrates are evaporated under reduced pressure and the residue of N-(3,4-dimethoxyphenethyl) - 3 - succinimidopropionamide crystallized from ethanol. Recrystallization from ethanol gives an M.P. of 127–128°.

*Anal.*—Calc'd for $C_{17}H_{22}N_2O_5$: C, 61.06; H, 6.63; N, 8.38; OCH₃, 18.56%. Found: C, 60.77; H, 6.67; N, 8.64; OCH₃, 18.36%.

A mixture of 10 g. of the above amide and 220 ml. of benzene under nitrogen is stirred at reflux until solution is complete. POCl₃ (22 ml.) is added and the stirring and heating is continued for an additional hour, at which time an oil has separated from the solution. The benzene and POCl₃ are removed under reduced pressure, the residual oil is dissolved in a small amount of ice water, and solid K₂CO₃ is added to pH 8. The solid which separates is filtered off and washed well with water. The combined aqueous solutions are extracted with ethyl acetate and the extracts evaporated to leave a crystalline residue. This residue is combined with that obtained from the aqueous solution and recrystallized from ethanol to give 3,4-dihydro-6,7-dimethoxy - 1 - (2-succinimidoethyl) isoquinoline, M.P. 162–164°.

*Anal.*—Calc'd for $C_{17}H_{20}N_2O_4$: C, 64.54; H, 6.37; N, 8.86; OCH₃, 19.62%. Found: C, 64.45; H, 6.38; N, 8.68; OCH₃, 19.75%.

A solution of 3.0 g. of this isoquinoline in 90 ml. of ethanol containing 0.3 g. of PtO₂ is hydrogenated at room temperature and 50 p.s.i. for 24 hours. The catalyst is filtered off and the solution evaporated under reduced pressure to give the title product, M.P. 166–167°, recrystallizable from acetone.

*Anal.*—Calc'd for $C_{17}H_{22}N_2O_3$: C, 67.52; H, 7.33; N, 9.27; OCH₃, 20.50%. Found: C, 67.35; H, 7.39; N, 9.28; OCH₃, 20.56%.

EXAMPLE 2

1,2,3-trimethoxy-8,13-diazaestra-1,3,5(10)-trien-17-one

To a stirred and cooled mixture of 20.0 g. of 3,4,5-trimethoxyphenethylamine (mescaline) and 12.0 g. of triethylamine in 150 ml. of tetrahydrofuran under nitrogen is added a solution of 18.6 g. of 3-succinimidopropionyl chloride in 150 ml. of tetrahydrofuran. After addition is complete, stirring is continued at room temperature for 8 hours and the resulting precipitate is filtered off and washed well with tetrahydrofuran. The precipitate is suspended in water to dissolve the triethylamine hydrochloride, and the water-insoluble amide is filtered off and washed well with water and then dried in vacuo at 80°. This compound, 3-succinimido - N-(3,4,5-trimethoxyphenethyl)propionamide, may be used directly for the next step, but can be recrystallized from ethanol to give M.P. 142–143°.

*Anal.*—Calc'd for $C_{18}H_{24}N_2O_6$: C, 59.33; H, 6.64; N, 7.69; OCH₃, 25.50%. Found: C, 59.06; H, 6.55; N, 7.84; OCH₃, 25.79%.

A suspension of 15 g. of the above amide and 400 ml. of benzene under nitrogen is refluxed. To this solution is added 60 ml. of POCl₃ and the mixture stirred and refluxed for an additional hour. The benzene and POCl₃ are removed from the clear solution in vacuo, and the resulting syrup is dissolved in a small amount of ice water. Solid K₂CO₃ is added to pH 8, the solution is extracted with chloroform, and the chloroform extracts are washed with saturated K₂CO₃ solution and dried over anhydrous K₂CO₃. The solvent is evaporated to give 3,4-dihydro - 1 - (2-succinimidoethyl)-6,7,8-trimethoxyisoquinoline. This material can be purified by passing a chloroform solution of the compound through a Florisil column, eluting with chloroform, evaporating the solvent, and crystallizing the resulting oil from ether to give M.P. 97–98°.

*Anal.*—Calc'd for $C_{18}H_{22}N_2O_5$: C, 62.41; H, 6.40; N, 8.09; OCH₃, 26.88%. Found: C, 62.17; H, 6.46; N, 8.32; OCH₃, 26.77%.

A solution of 3.0 g. of this isoquinoline in 100 ml. of ethanol containing 0.3 g. of PtO₂ is hydrogenated at room temperature and 50 p.s.i. for 60 hours. (The first mole of hydrogen is absorbed quickly (ca. 1 hour), but the absorption of the second mole is very slow. Hydrogenation of a more concentrated solution or in the presence of a small amount of HCl results in absorption of only 1 mole of hydrogen and the isolation of the tetrahydroisoquinoline.) After hydrogenation is complete, the catalyst is filtered off and washed with ethanol and the combined ethanol portions evaporated. The residue is crystallized from ether to give the title product, which is more thoroughly purified by chromatography on a Florisil column with chloroform and crystallization from ether to give M.P. of 138–139°.

*Anal.*—Calc'd for $C_{18}H_{24}N_2O_4$: C, 65.04; H, 7.28; N, 8.43; OCH₃, 28.01%. Found: C, 64.84; H, 7.35; N, 8.39; OCH₃, 28.10%.

We claim:
1. A compound of the formula

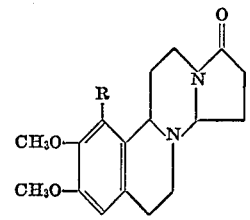

where R is hydrogen or methoxy, or a pharmaceutically acceptable acid addition salt thereof.

2. A compound as claimed in claim 1, where the compound is the free base.

3. A compound as claimed in claim 2, where R is hydrogen, being the compound 2,3-dimethoxy-8,13-diazaestra-1,3,5(10)-trien-17-one.

4. A compound as claimed in claim 2, where R is methoxy, being the compound 1,2,3 - trimethoxy-8,13-diazaestra-1,3,5(10)-trien-17-one.

References Cited

C.A. 61, 10734b (1964), Piatak et al.

ALEX MAZEL, Primary Examiner

R. V. RUSH, Assistant Examiner

U.S. Cl. X.R.

260—288, 326.3; 424—251